Jan. 27, 1925.

H. D. JAMES 1,524,553

CONTROL SYSTEM AND SWITCH MECHANISM THEREFOR

Filed Nov. 4, 1918

2 Sheets-Sheet 1

WITNESSES:
H. J. Shelhamer
David Rines

INVENTOR
Henry D. James
BY
Wesley G. Carr
ATTORNEY

Jan. 27, 1925.

H. D. JAMES 1,524,553

CONTROL SYSTEM AND SWITCH MECHANISM THEREFOR

Filed Nov. 4, 1918   2 Sheets-Sheet 2

WITNESSES:
H. T. Shelhamer
David Rines

INVENTOR
Henry D. James
BY
Wesley G. Carr
ATTORNEY

Patented Jan. 27, 1925.

1,524,553

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROL SYSTEM AND SWITCH MECHANISM THEREFOR.

Application filed November 4, 1918. Serial No. 260,950.

*To all whom it may concern:*

Be it known that I, HENRY D. JAMES, a citizen of the United States, and a resident of Edgewood Park, in the county of Allegheny and State of Pennsylvania, have invented a new and useful Improvement in Control Systems and Switch Mechanisms Therefor, of which the following is a specification.

My invention relates to systems of control of general application but more particularly to systems of control for electric motors, such, for example, as motor-accelerating systems involving main switches or contactors designed to close in succession to shunt a resistor.

In systems of the character above designated, each contactor is customarily provided with an auxiliary switch or a relay for governing the closing of the contactor, and, in order to avoid injuring the motor by excessive current, each contactor is adapted to close before the relay for controlling the next succeeding contactor can operate.

In my copending application, Serial No. 236,937, filed May 27, 1918, I have disclosed a motor-control system in which the relays for closing the contactors are controlled by a coil in parallel circuit with the accelerating resistor. The relays and the contactors are interlocked mechanically or electrically for a purpose therein fully explained, which is also explained below. Briefly, it may be stated that the purpose of the interlock is to insure the proper sequence of acceleration and deceleration when the master controller is moved backwardly and forwardly, or after a failure of voltage and the return of power to the line.

An object of the present invention is to provide an improved electrical interlocked system of the above-described character. I effect this object by connecting, in series with various of the contactor coils, additional coils for controlling the closing of the relays which control the next succeeding contactors.

Another object is to provide an improved switch for use in connection with my improved system.

Figure 1:
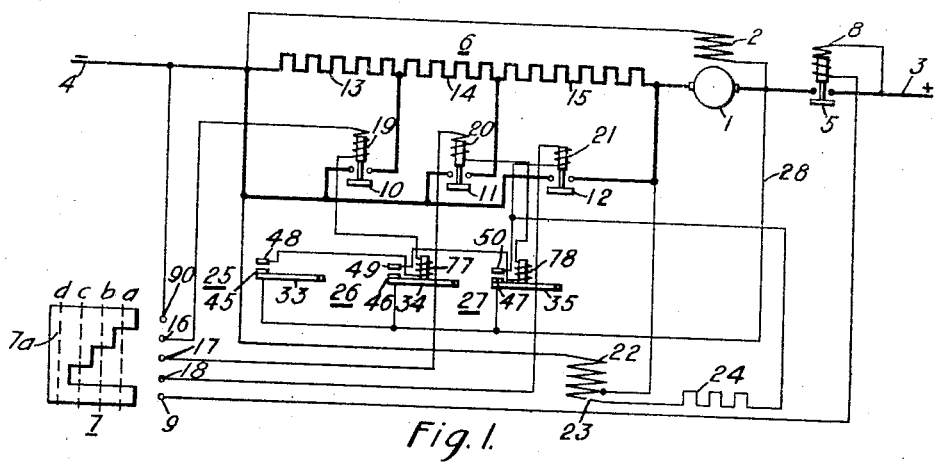
Figure 2:
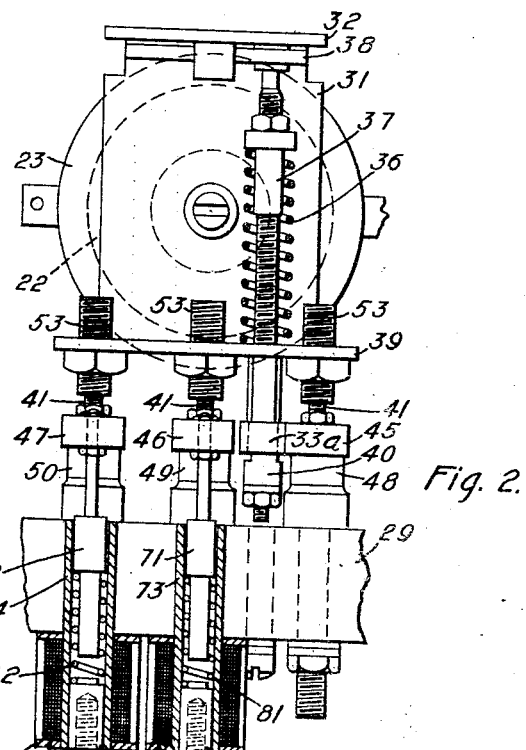
Figure 3:
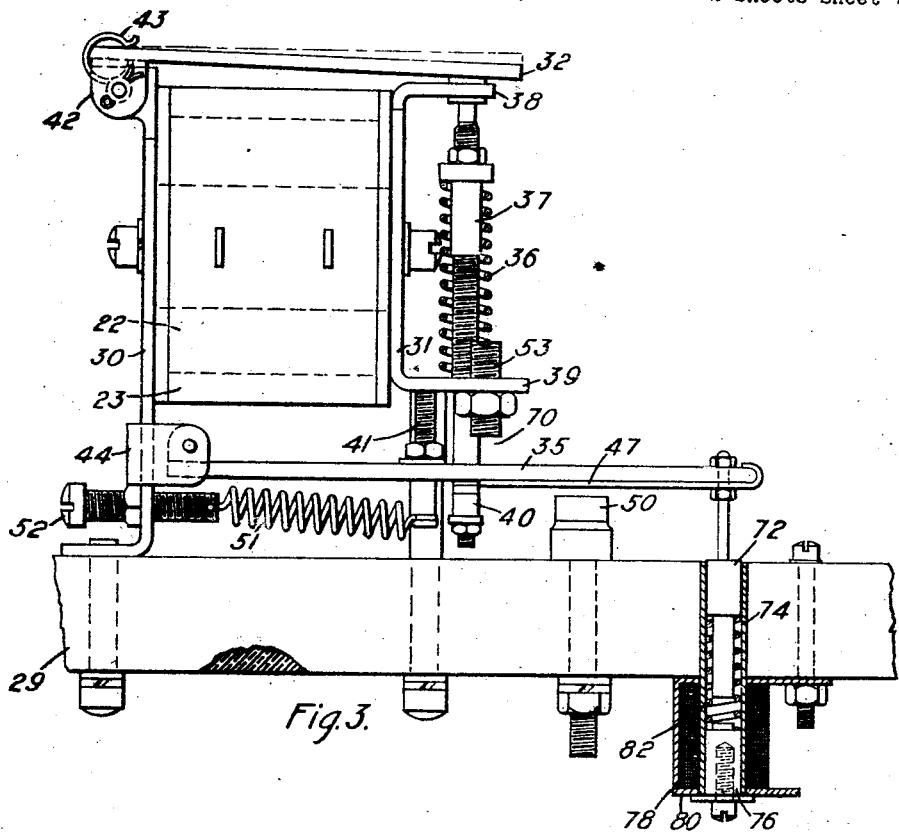

In the accompanying drawings, Figure 1 is a diagrammatic view of a system arranged according to my invention: Figs. 2 and 3 are, respectively, a front and a side elevation, partly in section, of my improved switch which may be employed in connection with the system of Fig. 1, and Fig. 4 is a bottom plan view of the switch, the panel being omitted for clearness.

Referring to Fig. 1, a motor, the armature of which is shown at 1 and the shunt field-magnet winding at 2, is connected between line conductors 3 and 4, separated by a line contactor 5, with a regulating resistor 6 normally in series with the armature 1. A master controller 7 controls the closing of the contactor 5, through an energizing coil 8, by effecting engagement of its movable contact member 7ª with stationary contact members 9 and 90. One or more contactors 10, 11 and 12 (three are illustrated) control the shunting of successive portions 13, 14 and 15 of the regulating resistor 6, through the medium of energizing coils 19, 20 and 21, which energization is effected by engagement of the movable contact member 7ª of the master controller 7 with the stationary contact members 16, 17 and 18, respectively. A coil 22 is connected in parallel circuit with the resistor 6, and a second coil 23 is connected, as below described, in circuit with a high external resistance 24, which may be embodied in the coil itself, if desired. The energizing of the coil 22, as explained below, permits the successive closing of relays 25, 26 and 27, in accordance with the strength of the current passing through it. The coil 19 and the relay 25 are series-connected in a circuit extending from the line conductor 3, through the contactor 5, a conductor 28 and the contact member 16 to the line conductor 4. The coil 20 and the relay 26, as well as the coil 21 and the relay 27, are in parallel relation to the coil 19 and the relay 25, their circuits respectively including the contact members 17 and 18.

The system thus far described forms, in substance, the subject-matter of my above-mentioned copending application. The present improvement resides in providing for interlocking the contactors 10 and 11 with the relays 26 and 27, respectively, this interlock comprising a coil 77 in series with the coil 19 and a second coil 78 in series with the coil 20, the coils 77 and 78 being designed to actuate the armatures 34 and 35 of the relays 26 and 27, respectively, to closed position, in accordance with circuit conditions, as described below, after the respective closing of the contactors 10 and 11, and thereby to cause the closing, respectively, of the contactors 11 and 12. The relay 27 closes also the circuit of the coil 23.

Figure 4:
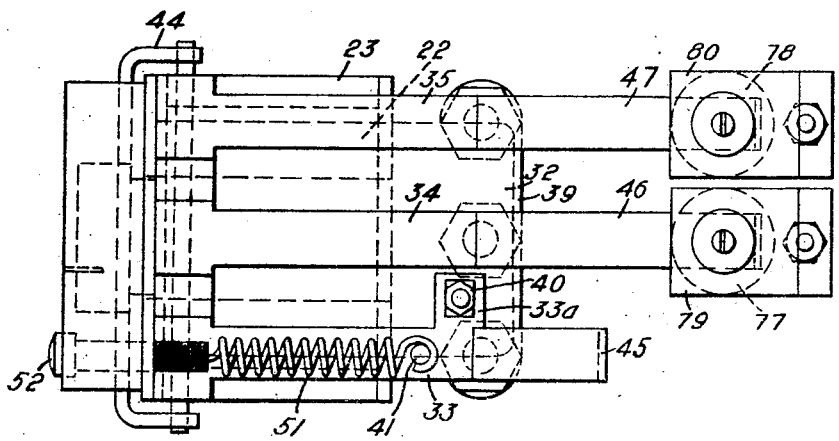

Referring now to Figs. 2, 3 and 4, an insulating panel 29 carries two brackets 30 and 31 that support the coils 22 and 23 which, when energized by current flowing through them, create magnetic fields for attracting an armature 32 and any desired number of additional armatures 33, 34 and 35. A compression spring 36 is adjustably mounted upon a non-magnetizable rod 37 which is slidably mounted in arms 38 and 39 of the bracket 31. The arm 38 serves also as a pole piece for the armature 32, and the projection 39 as a pole piece for the armatures 33, 34 and 35. The rod 37 extends through an opening in a projection 33ᵃ of the armature 33 and is provided with an abutment 40 to engage this projection. The spring 36 thus normally maintains the armature 33 in its open position, with a member 41, which is carried by this armature, in contact with the pole piece 39. The armatures 34 and 35 are similarly provided with members 41, these members 41 being preferably composed of non-magnetizable material to prevent "freezing."

The armature 32 is provided with lugs or ears 42, which are pivotally mounted upon the bracket 30, and is normally maintained in contact with one end of the rod 37 by a weak spring 43. The bracket 30 supports a non-magnetizable U-shaped member 44 between the arms of which are pivotally mounted the armatures 33, 34 and 35, which carry, respectively, the movable contact members 45, 46 and 47 of the relays 25, 26 and 27. The corresponding stationary contact members 48, 49 and 50 are mounted upon the insulating panel 29.

A spring 51 is attached to a longitudinally adjustable member 52 and to the other end of that member 41 which is mounted upon the armature 33. The pole piece 39 is provided with longitudinally adjustable members 53 to regulate air gaps 70 between these members and the corresponding armatures. By means of this adjustment, the action of the magnetic flux produced by the coils 22 and 23 may be so regulated that the armatures 33, 34 and 35 will be operated in proper sequence.

The armatures 34 and 35 are respectively provided with plungers 71 and 72, which are adapted to reciprocate within non-magnetizable tubes 73 and 74 toward pole pieces 75 and 76. These pole pieces may be energized by the coils 77 and 78 supported upon frames 79 and 80. The plungers 71 and 72 are normally spring-pressed out of engagement with the corresponding pole pieces 75 and 76, by springs 81 and 82, to maintain the armatures 34 and 35 open. The plungers 71 and 72 may, as shown, be rigidly connected to the corresponding armatures, or may be pivotally connected thereto.

The operation is as follows: Upon the actuation of the master controller 7 to the position a, the coil 8 is energized to close the line contactor 5, which completes the motor circuit. Current then flows through the armature 1 and the resistor 6 and also through the shunt field-magnet winding 2, as well as through the shunt coil 22. Energization of the coil 22 creates a magnetic field which attracts the armature 32 to the pole piece 38, as illustrated in Fig. 3. The movement of the armature 32 is from the broken-line to the full-line position of Fig. 3. The rod 37 is thereupon pressed inwardly, in opposition to the force of the spring 36, forcing the abutment 40 away from the armature 33. If the current is above a previously selected safe value, the flux of the magnetic field will overcome the force of the spring 51, and the armature 33 will remain with its stop 41 in engagement with the pole piece 39. As the motor accelerates and the current begins to die down, the magnetic flux set up by the coil 22 becomes weakened. After a time, when the flux has decreased to a predetermined value, the spring 51 will overcome the flux of this field, and close the relay 25. The time when this operation occurs depends upon the air gap 70 and the tension of the spring 51. The relays 26 and 27, however, remain open.

If the master controller 7 is actuated to the position b, a circuit will be established from the line conductor 3 through the contactor 5, the conductor 28, the relay 25, the coils 77 and 19, the contact member 16, the movable contact member 7ᵃ and the contact member 90 of the master controller to the line conductor 4. The closing of this circuit energizes the coils 77 and 19, the latter of which causes the closing of the contactor 10, and this, in turn, establishes a shunt circuit for the portion 13 of the resistor 6. The relay 26 does not yet close because the combined force of the coil 22 and the spring 81 is great enough to overpower the force of the coil 77. The motor then further accelerates to decrease the voltage across the terminals of the coil 22 and thus weaken the magnetic field in the neighborhood of this coil, whereupon the coil 77 will close the relay 26. A circuit is then made, assuming that the master controller occupies the position c, from the line conductor 3, through the contactor 5, the conductor 28, the relay 26, the coils 78 and 20 and the contact members 17, 7ᵃ and 90, to the line conductor 4. The coil 20, thus becoming energized, causes the closing of the contactor 11 and the consequent shunting of the resistor 14, but the coil 78 is not yet effective to actuate the armature 35. After the motor has further accelerated, the magnetic field surrounding the coil 22 is again weakened and the relay 27 is closed by the coil 78, as soon as the magnetism in the coil 22 is low enough to permit this closing. A circuit is then established, if the master controller occupies the position $d$, from the line conductor 3, through the contactor 5, the conductor 28, the relay 27, the coil 21 and the contact members 18, 7ª and 90, to the line conductor 4, thereby causing the energization of the coil 21 and the closing of the contactor 12. The resistor 6 is then entirely shunted from the armature circuit, and the armature 1 is connected directly across the line.

The shunting of the entire resistor 6 de-energizes the coil 22 and tends to release the armature 32 and open the relay 25, and this, in turn, would reopen the control circuits and reinsert the resistor 6 into the armature circuit. This is prevented by the coil 23, the circuit of which is closed by the relay 27, and which is energized by the counter-electromotive force of the armature 1.

The master controller 7 may obviously be actuated step-by-step to the position $d$, or in a single step. In the latter event, the above-described operations will take place automatically and in sequence.

If, now, the motor remaining at high speed, the movable member 7ª of the master controller 7 be actuated to position $a$, de-energizing the coils 19, 20, 21, 77 and 78, the contactors 10, 11 and 12 and the relays 26 and 27 will open. The coil 22, being in parallel circuit with the resistor 6, the armature 32 will be maintained in its illustrated position (Fig. 3), whereby, upon again actuating the controller 7 to the position $d$, the coil 19 will become energized to cause the closing of the contactor 10. The coil 77, becoming energized simultaneously with the energization of the coil 19, will operate as before to close the armature 34 of the relay 26 when the magnetism in the coil 22 is low enough to permit this closing. Not until the relay 26 has closed, however, can the circuit of the coil 20 be closed to cause the actuation of the contactor 11. Thus, the contactor 11 cannot close simultaneously with the contactor 10 but must close somewhat later, the interval of time being determined by the conditions of the motor circuit, as above described. Similarly, the contactor 12 cannot be closed until the coil 21 is energized and this cannot happen until the relay 27 is closed, which, in turn, must await the energization of the coil 20 and, simultaneously therewith, that of the coil 78.

The danger of suddenly throwing the armature 1 into the line circuit without any resistance in series with it upon the actuation of the controller 7 to the first position and its immediate reactuation to intermediate or final position, which is often desirable, is thus avoided. A similar effect is obtained when, after a failure of line voltage, energy is again supplied to the motor.

The coils 77 and 78 may be connected in parallel with coils 19 and 20 instead of in series. With this arrangement, resistance of suitable temperature coefficient may be put in series with coils 77 and 78 to reduce the variations in the pulls of these coils due to temperature variations. Coils 77 and 78 may, for example, be wound with wire having a zero-temperature coefficient. Variations in temperature would not, in such case, affect the value of the energizing current. This arrangement permits a heavy pressure to be maintained on the contact members 46 and 47, due to the pulls of the coils 77 and 78.

Although I have illustrated and described a simple form of attaining the result of insuring the proper operation of a system of motor control, it will be understood that I am not to be limited to the exact connections described, but that my invention is commensurate with the breadth of the appended claims.

I claim as my invention:

1. The combination with an electric motor, a starting resistor therefor, a plurality of switches for short-circuiting said resistor, each having an actuating coil, and a plurality of relay members adapted to close to energize said coils, of electromagnetically-controlled means for maintaining said relay members open, and a plurality of actuating coils each of which is adapted to close one of said relay members and each of which is in circuit with one of said switch coils.

2. The combination with an electric motor, a starting resistor therefor, of a pair of switches for controlling the short-circuiting of said resistor, means tending to close one of said switches, means tending to open said other switch, an energizing coil in parallel circuit with said resistor for maintaining said switches open, and an energizing coil for closing said other switch.

3. The combination with an electric motor and a starting resistor therefor, of a pair of switches for short-circuiting said resistor and each having an actuating coil, a pair of relay members adapted to close to energize said coils, means dependent upon the voltage of said resistor for delaying the closing of said relay members, means for preventing the closing of one of said relay members when one of said switches is open, and an actuating coil in series with the coil of said one switch for closing said one relay member when said one switch is closed.

4. The combination with an electric motor and a starting resistor therefor, of a pair of switches for short-circuiting said resistor each of which has an actuating coil, a pair of relay members adapted to close to energize said coils, an energizing coil in parallel circuit with said resistor for delaying the closing of said relay members, an actuating coil in series with the coil of one of said switches for closing one of said relay members, and means for maintaining said relay members closed after said resistor is short-circuited.

5. The combination with an electric motor and a starting resistor therefor, of means for controlling said resistor comprising a plurality of switches having actuating coils, a relay mechanism for controlling said switches comprising a plurality of members having actuating coils in circuit with certain of the actuating coils for said switches, means for opposing the closing of said relay members in accordance with the drop in potential across said resistor whereby the relay members effect the closing of said switches successively in accordance with the degree of acceleration of said motor.

6. The combination with a motor and a resistor in circuit therewith, of a plurality of electromagnetic switches for controlling said resistor, means for controlling said switches comprising a relay member for each switch, means for maintaining said relay members in open position by forces proportional to the drop in potential across said resistor, electromagnetic means tending to close said relay members and means for restoring said relay members when the closing means is rendered ineffective.

7. The combination with a motor and a resistor in circuit therewith, of a plurality of electromagnetic switches for controlling said resistor, means for controlling said switches comprising a relay member for each switch, electromagnetic means for maintaining said relay members in open position by forces proportional to the drop in potential across said resistor, electromagnetic means tending to close said relay members and means for insuring the restoration of said relay members when said closing means is ineffective.

8. The combination with a motor and a resistor in circuit therewith, of a plurality of electromagnetic switches for controlling said resistor, means for controlling said switches comprising a relay member for each switch, means for maintaining said relay members in open position by forces proportional to the drop in potential across said resistor and a coil in series with the actuating coil of each of said switches tending to close the respective relay members.

9. The combination with a motor and a resistor in circuit therewith, of a plurality of electromagnetic switches for controlling said resistor, means for controlling said switches comprising a relay member for each switch, means for maintaining said relay members in open position by forces proportional to the drop in potential across said resistor and an electromagnet for controlling each of said relay members, said electromagnets each comprising a coil in circuit with the actuating coil of one of the switches, an armature member and a spring for yieldingly maintaining the armature member in one position.

In testimony whereof, I have hereunto subscribed my name this 30th day of Oct., 1918.

HENRY D. JAMES.